US009218163B2

(12) United States Patent
Dehors et al.

(10) Patent No.: US 9,218,163 B2
(45) Date of Patent: Dec. 22, 2015

(54) GENERATING COMPLEX EVENT PROCESSING RULES

(75) Inventors: Sylvain Dehors, Antibes (FR); Opher Etzion, Haifa (IL); Mark H. Linehan, Yorktown Heights, NY (US); Ella Rabinovich, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 13/170,446

(22) Filed: Jun. 28, 2011

(65) Prior Publication Data

US 2013/0006608 A1 Jan. 3, 2013

(51) Int. Cl.
*G06F 17/27* (2006.01)
*G06F 9/44* (2006.01)
*G06F 9/45* (2006.01)

(52) U.S. Cl.
CPC ... *G06F 8/30* (2013.01); *G06F 8/41* (2013.01)

(58) Field of Classification Search
CPC .......... G06F 17/2785; G06F 17/30864; G06F 17/274; G06F 17/271; G06F 17/30734; G06F 17/2705; G06F 17/277; G06F 17/21; G06F 17/30684; G06F 17/30657; G06F 17/27
USPC ............... 704/1-10, 250, 251, 255, 257, 270; 707/780
See application file for complete search history.

(56) References Cited

U.S. PATENT DOCUMENTS 4,914,590 A * 4/1990 Loatman et al. .................. 704/8
7,613,676 B2 11/2009 Baisley et al.
2006/0161414 A1 7/2006 Carignano et al.
2007/0250525 A1 10/2007 Sanghvi et al.
2008/0301124 A1 12/2008 Alves et al.
2008/0301125 A1 12/2008 Alves et al.
2008/0301135 A1 12/2008 Alves et al.

(Continued)

FOREIGN PATENT DOCUMENTS

EP 0256881 A2 2/1988
EP 1832975 A1 9/2007

OTHER PUBLICATIONS

"Complex Event Detection at Wire Speed with FPGAs" Louis Woods Jens Teubner Gustavo Alonso Systems Group, Proceedings of the VLDB Endowment, vol. 3, No. 1. The 36th International Conference on Very Large Data Bases, Sep. 1317, 2010, Singapore.*

(Continued)

*Primary Examiner* — Huyen Vo
(74) *Attorney, Agent, or Firm* — Ryan, Mason & Lewis, LLP

(57) ABSTRACT

Techniques for generating complex event processing rules in a controlled natural language are provided. The techniques include obtaining one or more vocabularies that encompass a set of one or more noun and verb concepts, dynamically building an inheritance hierarchy of one or more named vocabulary concepts from the one or more vocabularies, parsing a controlled natural language input textual statement by using one or more names and the inheritance hierarchy to identify one or more temporal concepts and one or more complex event processing concepts, and converting the controlled natural language input textual statement to a complex event processing language statement by generating a representation of a lexical structure of the controlled natural language input textual statement that contains a reference to each identified temporal and complex event processing concept.

22 Claims, 4 Drawing Sheets

(56) References Cited

U.S. PATENT DOCUMENTS

| | | | | |
|---|---|---|---|---|
| 2010/0017379 | A1 | 1/2010 | Naibo et al. | |
| 2010/0017380 | A1 | 1/2010 | Naibo et al. | |
| 2010/0106728 | A1 * | 4/2010 | Waldo et al. | 707/741 |
| 2011/0202334 | A1 * | 8/2011 | Abir | 704/4 |
| 2011/0213783 | A1 * | 9/2011 | Keith, Jr. | 707/741 |
| 2011/0251902 | A1 * | 10/2011 | Nagarajayya | 705/14.71 |
| 2012/0166180 | A1 * | 6/2012 | Au | 704/9 |
| 2012/0245924 | A1 * | 9/2012 | Brun | 704/9 |
| 2012/0303358 | A1 * | 11/2012 | Ducatel et al. | 704/9 |
| 2013/0041921 | A1 * | 2/2013 | Cooper et al. | 707/780 |

OTHER PUBLICATIONS

"Semantic web tutorial: RDF, RDFS and SPARQL using CORESE" updated Apr. 17, 2007, available at http://web.archive.org/web/20120226063932/http://www-sop.inria.fr/acacia/soft/corese/tutorial.php—Gandon et al.*

Prova Grammar, http://www.prova.ws/index.html?page=gram.php, downloaded Jan. 3, 2012.

Eckert, A Dissertation, Complex Event Processing with XChargeEQ: Language Design, Formal Semantics, and Incremental Evaluation for Querying Events, Oct. 2008, pp. 1-301.

Paschke, Rule Responder HCLS eScience Infrastructure, 3rd International Conference on the Pragmatic Web, Sep. 28-30, 2008.

Paschke et al., A Homogeneous Reaction Rule Language for Complex Event Processing, VLDB '07, Sep. 23-28, 2007, Vienna, Austria.

Klinger et al., Business Event Processing with WebSphere Business Events, Part 2: Building Business Events Application, Oct. 2008, pp. 1-35.

Tibco Business Events, http://www.tibco.com/products/business-optimization/complex-event-processing/businessevents/businessevents.jsp, pp. 1, downloaded Jan. 3, 2012.

Etzion et al., Event Processing in Action, Manning 2011, ISBN 9781935182214.

Luckham, The Power Events, Chapter 8, Addison-Wesley Professional, 2002, ISBN 978-0201727890.

Websphere Business Events. IBM Product that Implements Complex Event Processing, pp. 1-3, 2009.

Tibco Business Events, http://www.tibco.com/products/business-optimization/complex-event-processing/businessevents/default.jsp, pp. 1, downloaded Jan. 3, 2012.

Attempto Project, http://attempto.ifi.uzh.ch/site/main.php?text=description/description.html, pp. 1-2, downloaded Jan. 3, 2012.

Rewerse, Reasoning on the Web, http://rewerse.net/, pp. 1-2, downloaded Jan. 3, 2012.

Sowa, Ontology, Metadata, and Semiotics, pp. 1-22, ICCS'2000 in Darmstadt, Germany.

OMG, Documents Associated with Semantics of Business Vocabulary and Business Rules (SBVR), Version 1.0, http;//www.omg.org/spec/SBVR/1.0/ pp. 1, downloaded Jan. 3, 2011.

Sakurai et al., Toward Open World and Multimodal Situation Models for Sensor-Aware Web Platforms, Ubiquitous Computing and Multimedia Applications, Second International Conference, UCMA 2011, Apr. 13-15, 2011, pp. 285-293.

* cited by examiner

GENERATING COMPLEX EVENT PROCESSING RULES

FIELD OF THE INVENTION

Embodiments of the invention generally relate to information technology, and, more particularly, to event processing.

BACKGROUND OF THE INVENTION

Complex event processing (CEP) combines the concepts of stateful processing across multiple events, stateless processing, temporal reasoning, event organization into contexts that may partition event streams, and semantic policies that specify directives for inclusion and ordering of events within the reasoning process. By way of example, such policies can include a consumption policy, should events already matched to a complex event get reused for other matching, as well as a repeated type policy, given multiple events of the same type, should first or last or all events be used for matching.

Capturing such items in a controlled natural language (CNL) requires vocabulary concepts that formalize them. Existing approaches include the use of graphical editors that do not parse textual input and also produce output that merely appears similar to natural language, but instead is forms-based, not text. In contrast to existing approaches, the interaction among these concepts should be designed both to support CEP rules and to make them understandable to users in CNL statements. Also, the formalization should enable the conversion of the CNL statements to the CEP implementation, and the formalization should avoid duplication of concepts but may use synonyms to provide alternative terms for the same concepts.

SUMMARY OF THE INVENTION

Principles and embodiments of the invention provide techniques for generating complex event processing rules and associated language constructs such as contexts. An exemplary method (which may be computer-implemented) for generating complex event processing rules in a controlled natural language, according to one aspect of the invention, can include steps of obtaining one or more vocabularies that encompass a set of one or more noun and verb concepts, dynamically building an inheritance hierarchy of one or more named vocabulary concepts from the one or more vocabularies, parsing a controlled natural language input textual statement by using one or more names and the inheritance hierarchy to identify one or more temporal concepts and one or more complex event processing concepts, and converting the controlled natural language input textual statement to a complex event processing language statement by generating a representation of a lexical structure of the controlled natural language input textual statement that contains a reference to each identified temporal and complex event processing concept.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
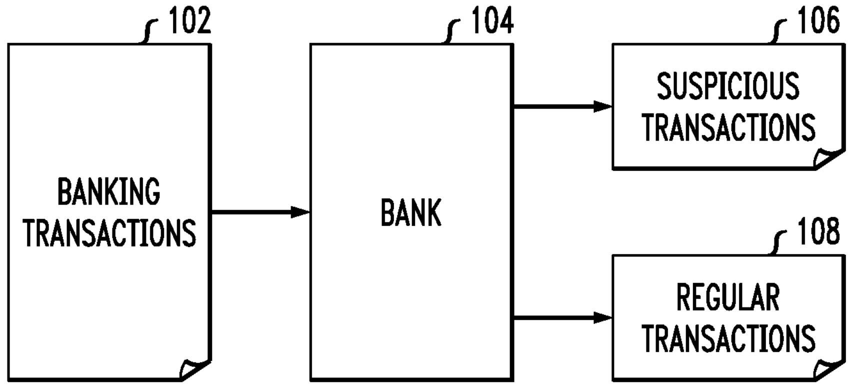
FIG. 1 is a diagram illustrating an example CEP scenario, according to an embodiment of the present invention.

Principles of the invention include a controlled natural language (CNL) for defining complex event processing (CEP) rules and associated language constructs. One or more embodiments of the invention provide techniques for how to employ a natural language syntax to identify patterns that occur within a collection of data streams where the sequence of data values in the pattern and their placement in time are both of import. Accordingly, the techniques described herein enable individuals/users, as opposed to only programmers, to search data streams for temporal patterns.

As used herein, controlled natural languages are subsets of natural languages, obtained by restricting grammar and vocabulary in order to reduce or eliminate ambiguity and complexity. Traditionally, controlled languages fall into two major types: those that improve readability for human readers (for example, non-native speakers), and those that enable reliable automatic semantic analysis of the language. Additionally, a production system (or production rule system) is a computer program typically used to provide some form of artificial intelligence, which includes a set of rules about behavior. These rules, termed productions, are a basic representation found useful in automated planning, expert systems and action selection. A production system provides the mechanism used to execute productions in order to achieve some goal for the system.

Productions include a sensory precondition (or "IF" statement) and an action (or "THEN"). If a production's precondition matches the current state of the world, the production is said to be triggered. If a production's action is executed, it is said to have fired. A production system contains a database, also referred to as working memory, which maintains data about current state or knowledge, and a rule interpreter. The rule interpreter provides a mechanism for prioritizing productions when more than one is triggered.

An event is an occurrence within a particular system or domain. That is, an event is something that has happened, or is contemplated as having happened in that domain. The word event is also used to denote the programming entity representing such an occurrence. In a computing system, an event may be a programming entity that represents such an occurrence in a computing system.

A complex event processing (CEP) is event processing that derives resulting derived events from other events by pattern recognition, filtering, transformation, or aggregation. CEP processing may be implemented in a CEP rule engine, in a database, in an extended query language, or in an imperative programming language. A derived event is an event that is generated as a result of event processing that takes place inside the event processing system. Derived events are derived (by pattern recognition, filtering, aggregation, etc.) from other events, or from the absence of events.

Stateless event processing includes handling one event at a time, as in production rules. Stateful event processing includes processing multiple events in order to detect patterns among them and/or aggregate across multiple events. Stateful event processing is a characteristic that distinguishes CEP systems from production rule engines. Context is a named specification of conditions that groups event instances so that they can be processed in a related way. An event pattern is a template specifying one or more combinations of events. Given any collection of events, one or more subsets of those events may be able to be found that match a particular pattern.

Aggregation includes applying a function over a collection of events to create a single derived event. Filter expression includes a predicate that is evaluated against an event. The event passes the filter if the predicate is TRUE and fails the filter if the predicate is FALSE.

Also, a concept is a noun concept or a verb concept. A noun concept is a concept that is the meaning of a noun or noun phrase (from Semantics of Business Vocabulary and Business Rules (SBVR)), while a verb concept is a concept that relates one or more noun concepts to each other or to a condition. A term is a name for a concept, and concepts may or may not have definitions. A definition is a representation (as through a word or phrase) expressing the essential nature of a person or thing or class of persons or of things. The "essential nature" may be specified in terms of another class of things plus a distinguishing characteristic. For example, a "convertible" can be a member of the class of things called "car," with the distinguishing characteristic that a convertible has a removable roof. Definitions done this way form a subsumption or inheritance hierarchy (also referred to as a taxonomy).

Figure 2:
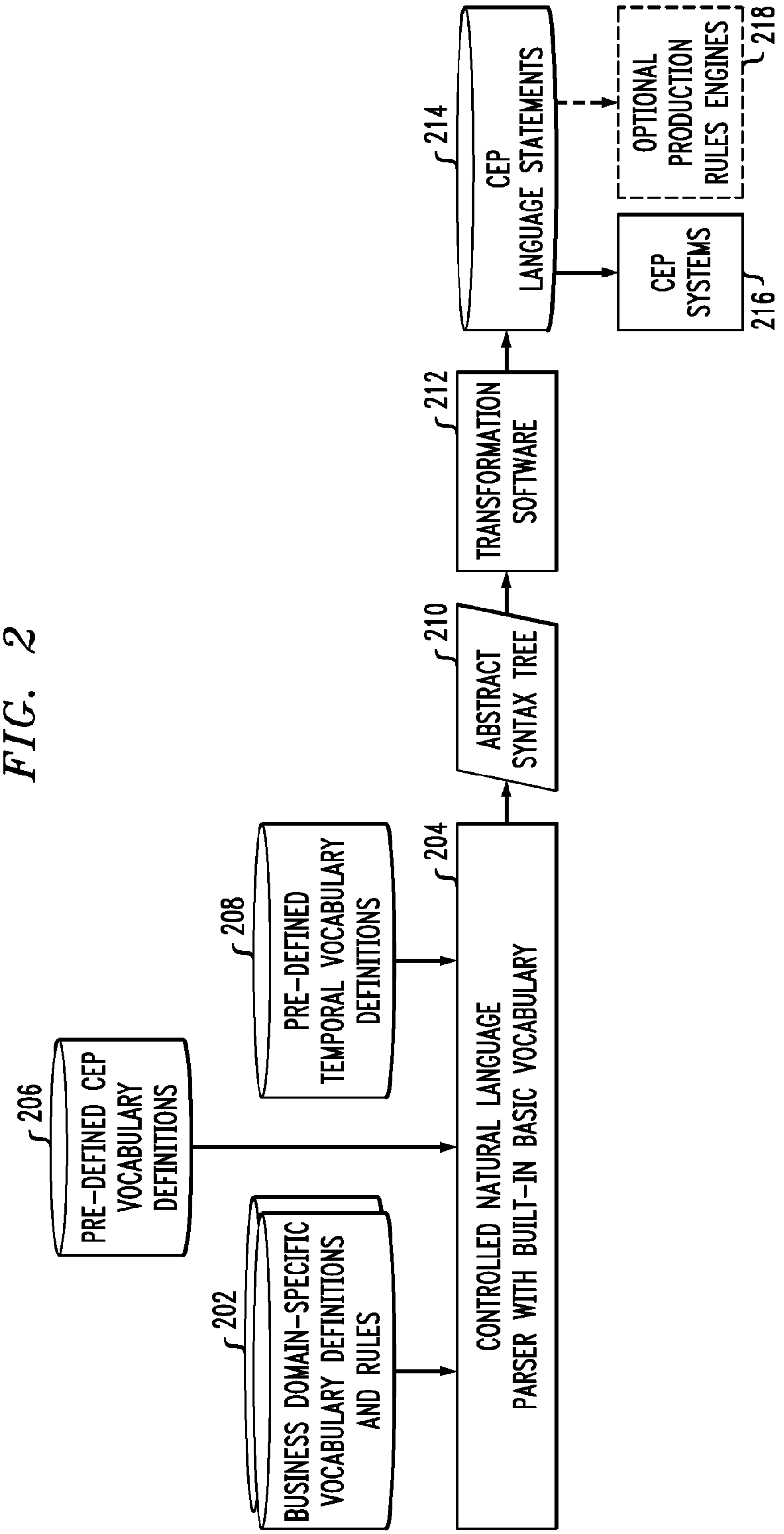
FIG. 2 is a block diagram illustrating an example embodiment, according to an aspect of the invention.

In one or more embodiments of the invention, definitions may be specified formally, entirely using CNL keywords and terms that are themselves defined in the vocabularies. As illustrated in FIG. 2 (detailed below), the formal definitions depend, directly or indirectly, upon either (a) the basic set of concepts and relationships defined by the CNL parser (which is part of step 204); (b) the temporal and event concepts supported by the software that converts the abstract syntax tree to CEP rules (which is part of steps 206 and 208); or (c) the events defined in business/enterprise domain vocabularies (which is part of step 202). The parser depends upon (a). The transformation software depends upon (a) plus (b). The rules engine(s) apply the temporal and event concepts of (b) and the basic concepts of (a) to the events of (c) to recognize and act upon derived events.

Both noun and verb concepts have definitions. A definition can be thought of as a rule that distinguishes a class of noun concepts from other classes of noun concepts or that describes how two or more noun concepts relate to each other or that describes what distinguishes a condition of a noun concept.

Terms for verb concepts are defined using parsing templates, which include alternating roles and verbs. As note further herein, terms for noun concepts are underlined, terms for verb concepts are italicized, and keywords are bold. For example:

<role> <verb> (for a unary verb concept, with just one role). Example: "car is red," where "car" is the role and "is red" is the verb.

<role1> <verb> <role2> (for a binary verb concept). Example: "driver drives car," where "driver" and "car" are roles and "drives" is the verb.

<role1> <verb1> <role2> <verb2> <role3> (for a 3-role verb concept). Example: "driver drives car to store," with roles of "driver," "car," and "store," and verbs of "drives" and "to."

The pattern may be extended to any number of verbs and roles.

Roles can have (and normally do have) the same terms (names) as noun concepts. Verb concepts are employed in definitions and other rules. The text of the rules is matched to the verb concepts by recognizing the literal verbs and by matching instances of the noun concepts. For example, "Bill drives car123" matches the verb concept "driver drives car" if "Bill" is defined as a driver and "car123" is defined as a car. Additionally, the parsing templates may be extended by articles (for example, "a" or "the") that precede the roles in order to help distinguish the roles from the verbs. In one or more embodiments of the invention, the parser may also automatically recognize variants of nouns and verbs such as singular/plural and transitive/intransitive forms.

By way simply of illustration, consider the following example that uses the SBVR "Structured English" form of CNL:

car: vehicle that has a motor and transports people
person, synonym people
person is licensed to drive
driver: person that is licensed to drive
driver drives car: the driver controls the speed and direction of the car
(KEY: terms for noun concepts are underlined, terms for verb concepts are italicized, and keywords are bold.)

In the above example, "car" is a term for a noun concept that is informally defined (not all the words in the definition are keywords or other vocabulary concepts). "Person" is a term for a noun concept that is not defined and has a synonym "people." "Person is licensed to drive" is a verb concept that applies to one noun concept ("person"). "Driver" is a noun concept that is formally defined as a subtype of "person," and "driver drives car" is a verb concept with an informal definition.

Not all concepts have definitions, and specifying the terms provides information to the parser. The parser is dynamically enriched with synonym and subtype information. Additionally, an engine can evaluate definitions and other rules.

FIG. 1 is a diagram illustrating an example CEP scenario, according to an embodiment of the present invention. By way of illustration, FIG. 1 depicts banking transactions 102, which are provided to a bank 104, which then provides outputs of suspicious transactions 106 and regular transactions 108.

In connection with the example depicted in FIG. 1, banks can be required by governments to recognize and report "suspicious" transactions, under various criteria for "suspicious." Often, these criteria involve multiple transactions over some period of time, involving the same transaction sender or receiver. For instance, an example might include more than four cash deposits over some monetary threshold within two days. Another example (a CEP example) might include the following.

1. transaction: event that is an exchange or transfer of goods, services or funds.
2. suspicious transaction: derived event that matches a transaction by applying the frequent match pattern using the same account within period context.
3. frequent match pattern: threshold pattern that tests that the count of the participant events of the derived event of the frequent match pattern is greater than 4.
4. same account within period context: composite context that combines (same account context, time period).
5. same account: segmentation context that segments transactions by the receivers of the transactions.
6. time period: sliding fixed interval context that starts every 1 day for 2 days.

(KEY: terms for noun concepts are underlined, terms for verb concepts are italicized, and keywords are bold.)

The following concepts are pre-defined in the temporal and events vocabularies, and recognized by the transformation software:

event, derived event, pattern, context;
derived event matches events by applying pattern using context;
pattern tests Boolean;
composite context combines contexts;
segmentation context segments events by Boolean; and
sliding fixed time interval context starts every duration for duration.

Referring again to the above example, Line 1 defines transaction as a kind of event. Line 2 defines suspicious transaction as a derived event that is derived by recognizing transactions (per the matches role) that fit the frequent match pattern (line 3) according to the same account within period context (line 4). Line 3 defines a threshold pattern that recognizes when more than four transactions arrive. Line 4 defines a composite context that incorporates two subsidiary contexts (discussed below). The derived event is specified on line 2 as including only those transactions that match both the pattern and this composite context.

Line 5 defines a segmentation context that partitions the transactions by transaction receiver. Further, Line 6 defines a sliding fixed time interval context that defines time windows starting every day and lasting two days.

As detailed herein, one or more embodiments of the invention include the use of pre-defined vocabularies, which might be implemented as individual vocabularies or combined in some way. A built-in vocabulary includes a predefined vocabulary containing keywords and concepts such as those in the SBVR specification. Such a vocabulary also has keywords for specifying definitions, terms, etc., and for mathematical constructs such as "and," "or," "each," "at least one," etc. Additionally, a built-in vocabulary has terms for noun concepts such as "noun concept" and for verb concepts such as "concept has more general concept."

A temporal vocabulary defines common concepts such as "duration" and "time of day," and relationships among them, such as "time of day2 is time of day1 plus duration." Such a vocabulary can be based on standards such as, for example, ISO 8601 and the International vocabulary of metrology—Basic and general concepts and associated terms (VIM). An events vocabulary defines terms for the noun concepts and relationships (for example, such as described in Etzion & Niblett, *Event Processing in Action*, Manning, 2011, ISBN 9781935182214). Such a vocabulary relies upon the built-in and temporal vocabularies.

FIG. 2 is a block diagram illustrating an example embodiment, according to an aspect of the invention. In one or more embodiments of the invention, a controlled natural language parser 204 has a built-in vocabulary that permits the parser to recognize keywords and a basic set of noun and verb concepts. As depicted in FIG. 2, the parser 204 takes as input one or more additional vocabularies (for example, business domain-specific vocabulary definitions and rules 202, pre-defined CEP vocabulary definitions 206, and pre-defined temporal vocabulary definitions 208) that extend the capabilities of the parser by defining additional terms for noun concepts and verb concepts.

The parser 204 also takes as input rules, either in the form of definition rules or structural rules or behavioral rules. These rules reference the noun and verb concepts from the vocabularies. Further, definitional rules are the part of definitions that specify distinguishing characteristics. Structural rules are rules that specify necessities or possibilities (for example, "Every person always has exactly two natural parents."). Behavioral rules are rules that specify obligations or permissions (for example, "Each invoice must be paid within 30 days.").

The parser 204 uses the concepts to distinguish defined terms from undefined terms in the input text. For verb concepts, the parser 204 matches roles in the verb concepts against parsed sentence tokens by matching the types of the sentence tokens against the declared types of the roles in the verb concepts. The noun concepts can include sub-types, where one noun concept is declared as a "kind of" of another noun concept. The parser 204 takes into account these sub-types when matching parsed sentence tokens against the types of roles in verb concepts.

As illustrated in FIG. 2, CNL vocabularies are defined for temporal concepts 208 and CEP concepts 206. The CEP vocabulary depends upon the temporal vocabulary to support patterns and contexts that deal with the arrival of events within various forms of time windows. Vocabularies (such as depicted in component 202) may also be defined for industry domains such as insurance, banking, etc., and for a specific enterprise or business solution. The industry, enterprise, or business solution vocabularies 202 may apply the concepts from the built-in, temporal 208, and CEP 206 vocabularies. Definitions of derived events may involve patterns, filters, aggregations, and contexts that are themselves defined using controlled natural language statements in the industry, enterprise or business solution vocabularies.

As further depicted in FIG. 2, the parser 204 produces an abstract syntax tree 210 which is input to the transformation software 212. Optionally, the abstract syntax tree could be transformed to another intermediate form for convenience or standards conformance. For example, it could be stored in the SBVR XML metadata interchange (XMI) format that is documented in the SBVR specification.

The transformation software 212 converts the rules from the text-based English-like language to one or more forms (such as CEP language statements 214) that are accepted by CEP systems 216 and/or production rules engines 218. The transformation converts definitions of derived events, with associated patterns, filters, aggregations, and contexts, to the specific language expected by the rule engine(s). The transformation recognizes the built-in, temporal, and event concepts in order to make this conversion.

The overall arrangement, as depicted, for example, in FIG. 2, permits one integrated CNL-based text language to support multiple different CEP systems and/or production rule engines that themselves have different input languages.

Figure 3:
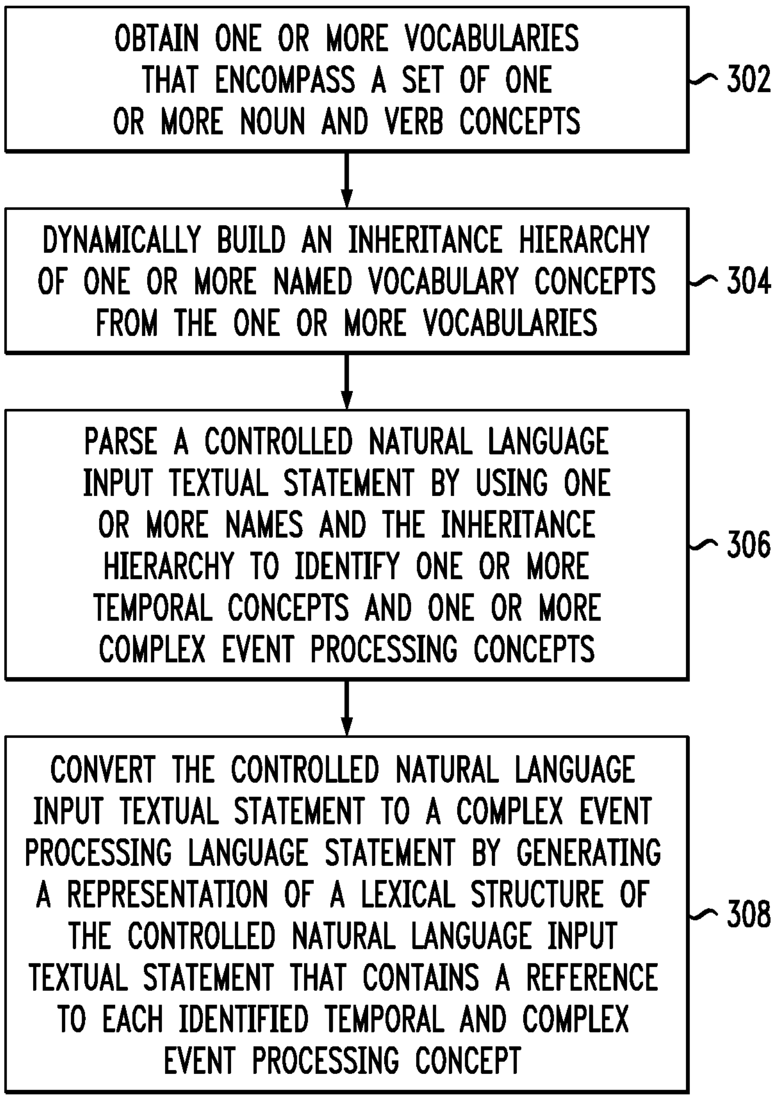
FIG. 3 is a flow diagram illustrating techniques for generating complex event processing rules in a controlled natural language, according to an embodiment of the invention.

FIG. 3 is a flow diagram illustrating techniques for generating complex event processing rules in a controlled natural language, according to an embodiment of the present invention. Step 302 includes obtaining one or more vocabularies that encompass a set of one or more noun and verb concepts. This step can be carried out, for example, using a parser module. The vocabularies can include a built-in vocabulary with a parser module. A basic set of language keywords supports synonyms for names. The noun concepts can include sub-types, wherein one noun concept is identified as a proximate (a "kind of") another noun concept.

Also, the vocabularies can include additional vocabularies that extend capabilities of the parser module by defining additional terms for noun concepts and verb concepts. As described herein, additional vocabularies can include, for example, a business domain-specific vocabulary, a pre-defined complex event processing vocabulary, and a pre-defined temporal vocabulary.

Further, the pre-defined complex event processing vocabulary can include definitions and names for one or more derived events. (The business domain vocabularies (as depicted by component 202 in FIG. 2) can also include such definitions and names.) If named, multiple CNL statements can incorporate the meaning of the derived events by referencing them by name. It can also include definitions and names for concepts of stateless and stateful patterns that are used to recognize derived events. If named, multiple CNL statements can incorporate the meaning of the patterns by referencing them by name. The pre-defined CEP vocabulary can additionally include definitions and names for concepts of stateless and stateful filter expressions that are used to include or exclude individual events from further processing. If named, multiple CNL statements can incorporate the meaning of the filter expressions by referencing them by name. It can further include definitions and terms for concepts of aggregation expressions that are applied to events. If named, multiple CNL statements can incorporate the meaning of the aggregation expressions by referencing them by name. Also, the pre-defined CEP vocabulary can additionally include definitions and terms for a grouping of events that meet specified criteria into named contexts. The advantage of defining and naming the contexts is that more than one CNL statements can reference the meaning of the contexts by referencing them by name.

One or more embodiments of the invention can also include using names to cross-reference vocabulary concepts from one or more other definitions and rules. Further, obtaining vocabularies can additionally include obtaining input rules, wherein the input rules include definition rules, structural rules and/or behavioral rules. The input rules reference one or more of the noun and verb concepts from the obtained vocabularies.

Step 304 includes dynamically building an inheritance hierarchy of one or more named vocabulary concepts from the one or more vocabularies. Step 306 includes parsing a controlled natural language input textual statement by using one or more names and the inheritance hierarchy to identify one or more temporal concepts and one or more complex event processing concepts. This step can be carried out, for example, using a parser module.

Parsing a controlled natural language input textual statement includes using the noun concepts to distinguish defined terms from undefined terms in the input textual statement. Also, parsing a controlled natural language input textual statement includes matching roles in the verb concepts against parsed input textual statement tokens by matching types of the input textual statement tokens against declared types of the roles in the verb concepts.

Step 308 includes converting the controlled natural language input textual statement to a complex event processing language statement by generating a representation of a lexical structure of the controlled natural language input textual statement that contains a reference to each identified temporal and complex event processing concept. This step can be carried out, for example, using a parser module and/or a transformation module.

Converting the controlled natural language input textual statement to a complex event processing language statement includes converting definitions of derived events, with associated patterns, filters, aggregations, and contexts, to a specific language expected by a rule engine. Additionally, converting the controlled natural language input textual statement to a complex event processing language statement can include using synonyms for providing alternative names for temporal concepts, complex event processing concepts, and/or domain concepts.

The techniques depicted in FIG. 3 can also include producing an abstract syntax tree from the input textual statement and inputting the abstract syntax tree to a transformation module for conversion to a complex event processing language statement. Inputting the abstract syntax tree to a transformation module for conversion to a complex event processing language statement includes recognizing the applications of as well as the reference to each identified temporal and complex event processing concept in the abstract syntax tree and converting each application and/or reference to a complex event processing concept in a complex event processing system (for example, such that the complex event processing system can recognize derived events from basic events according to complex event processing functions).

Additionally, one or more embodiments of the invention also include transforming the abstract syntax tree to an intermediate form, as well as transforming the abstract syntax tree to rules in a production rule engine.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a parser module and a transformation module that can run, for example, on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
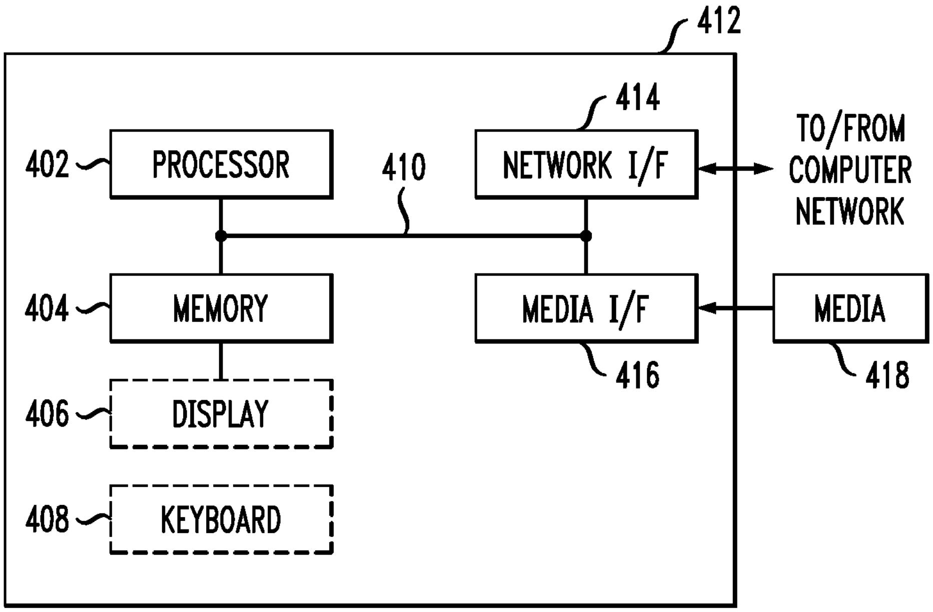
FIG. 4 is a system diagram of an exemplary computer system on which at least one embodiment of the invention can be implemented.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters. As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 2. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, employing a natural language syntax to identify patterns that occur within data streams where the sequence of data values in the pattern and their placement in time are both of import.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for generating complex event processing rules in a controlled natural language, wherein the method comprises steps of:

obtaining one or more controlled natural language vocabularies that encompass a set of one or more noun and verb concepts, wherein the one or more noun concepts comprise one or more sub-types, wherein each sub-type of a noun concept is identified as an example noun categorized under the noun concept;

dynamically building an inheritance hierarchy of one or more named vocabulary concepts from the one or more controlled natural language vocabularies;

parsing a controlled natural language input textual statement, wherein said parsing comprises matching one or more roles in the one or more verb concepts against the controlled natural language input textual statement and using one or more names and the inheritance hierarchy to identify one or more temporal concepts and one or more complex event processing concepts, and wherein said parsing is carried out via a parser component, executing on a hardware processor, that comprises (i) a specified built-in vocabulary and (ii) specified instructions to distinguish defined terms from undefined terms in the controlled natural language input textual statement using the built-in vocabulary;

converting the controlled natural language input textual statement to a complex event processing language statement by generating a representation of a lexical structure of the controlled natural language input textual statement that contains a reference to each identified temporal and complex event processing concept, wherein said converting comprises incorporating one or more synonyms for each identified temporal concept and complex event processing concept; and outputting the complex event processing language statement to an automated complex event processing system for use in event processing;

wherein each of the steps is carried out by the hardware processor.

2. The method of claim 1, wherein converting the controlled natural language input textual statement to a complex event processing language statement comprises converting one or more definitions of one or more derived events, with associated patterns, filters, aggregations, and contexts, to a specific language expected by a rule engine.

3. The method of claim 1, wherein the one or more vocabularies comprise a built-in vocabulary with a parser module.

4. The method of claim 3, wherein the one or more vocabularies comprise one or more additional vocabularies that extend capabilities of the parser module by defining one or more additional terms for noun concepts and verb concepts.

5. The method of claim 4, wherein the one or more additional vocabularies comprise at least one of a business domain-specific vocabulary and a pre-defined complex event processing vocabulary.

6. The method of claim 5, wherein the pre-defined complex event processing vocabulary comprises at least one of:

definitions and names for one or more derived events;

definitions and names for one or more concepts of one or more stateless and stateful patterns that are used to recognize one or more derived events;

definitions and names for one or more concepts of one or more stateless and stateful filter expressions that are used to include or exclude one or more individual events from further processing;

definitions and terms for one or more concepts of one or more aggregation expressions that are applied to one or more events; and definitions and terms for a grouping of one or more events that meet specified criteria into one or more named contexts.

7. The method of claim 6, further comprising using one or more names to cross-reference one or more concepts from one or more other definitions and rules.

8. The method of claim 4, wherein the one or more additional vocabularies comprise a pre-defined temporal vocabulary.

9. The method of claim 1, wherein obtaining one or more vocabularies further comprises obtaining one or more input rules, wherein the one or more input rules comprise at least one of definition rules, structural rules and behavioral rules.

10. The method of claim 9, wherein the one or more input rules reference one or more of the one or more noun and verb concepts from the one or more obtained vocabularies.

11. The method of claim 1, wherein parsing a controlled natural language input textual statement comprises using the one or more noun concepts to distinguish one or more defined terms from one or more undefined terms in the input textual statement.

12. The method of claim 1, wherein parsing a controlled natural language input textual statement comprises matching one or more roles in the one or more verb concepts against one or more parsed input textual statement tokens by matching one or more types of the input textual statement tokens against one or more declared types of the one or more roles in the one or more verb concepts.

13. The method of claim 1, further comprising producing an abstract syntax tree from the input textual statement and inputting the abstract syntax tree to a transformation module for conversion to a complex event processing language statement.

14. The method of claim 13, further comprising transforming the abstract syntax tree to an intermediate form.

15. The method of claim 13, wherein inputting the abstract syntax tree to a transformation module for conversion to a complex event processing language statement comprises:

recognizing the reference to each identified temporal and complex event processing concept in the abstract syntax tree and converting each reference to a complex event processing concept in a complex event processing system; and recognizing one or more applications of one or more temporal and complex event processing concepts in the abstract syntax tree and converting each application to one or more complex event processing semantic relationships in the complex event processing system such that the complex event processing system can recognize one or more derived events from one or more basic events according to one or more complex event processing functions.

16. The method of claim 13, further comprising transforming the abstract syntax tree to one or more rules in a production rule engine.

17. A computer program product comprising a tangible computer readable recordable storage device including computer useable program code for generating complex event processing rules in a controlled natural language, the computer program product including:

computer useable program code for obtaining one or more controlled natural language vocabularies that encompass a set of one or more noun and verb concepts, wherein the one or more noun concepts comprise one or more sub-types, wherein each sub-type of a noun concept is identified as an example noun categorized under the noun concept;

computer useable program code for dynamically building an inheritance hierarchy of one or more named vocabulary concepts from the one or more controlled natural language vocabularies;

computer useable program code for parsing a controlled natural language input textual statement, wherein said parsing comprises matching one or more roles in the one or more verb concepts against the controlled natural language input textual statement and using one or more names and the inheritance hierarchy to identify one or more temporal concepts and one or more complex event processing concepts, and wherein said parsing is carried out via a parser component, executing on a hardware processor, that comprises (i) a specified built-in vocabulary and (ii) specified instructions to distinguish defined terms from undefined terms in the controlled natural language input textual statement using the built-in vocabulary;

computer useable program code for converting the controlled natural language input textual statement to a complex event processing language statement by generating a representation of a lexical structure of the controlled natural language input textual statement that contains a reference to each identified temporal and complex event processing concept, wherein said converting comprises incorporating one or more synonyms for each identified temporal concept and complex event processing concept; and computer useable program code for outputting the complex event processing language statement to an automated complex event processing system for use in event processing.

18. The computer program product of claim 17, wherein the one or more vocabularies comprise a built-in vocabulary with a parser module and one or more additional vocabularies that extend capabilities of the parser module by defining one or more additional terms for noun concepts and verb concepts, wherein the one or more additional vocabularies comprise at least one of a business domain-specific vocabulary, a pre-defined complex event processing vocabulary and a predefined temporal vocabulary.

19. The computer program product of claim 17, further comprising computer useable program code for producing an abstract syntax tree from the input textual statement and inputting the abstract syntax tree to a transformation module for conversion to a complex event processing language statement, wherein the computer usable program code for inputting the abstract syntax tree to a transformation module for conversion to a complex event processing language statement comprises:

computer useable program code for recognizing the reference to each identified temporal and complex event processing concept in the abstract syntax tree and converting each reference to a complex event processing concept in a complex event processing system; and computer useable program code for recognizing one or more applications of one or more temporal and complex event processing concepts in the abstract syntax tree and converting each application to one or more complex event processing semantic relationships in the complex event processing system such that the complex event processing system can recognize one or more derived events from one or more basic events according to one or more complex event processing functions.

20. A system for generating complex event processing rules in a controlled natural language, comprising:

a memory; and at least one processor coupled to the memory and operative to:

obtain one or more controlled natural language vocabularies that encompass a set of one or more noun and verb concepts, wherein the one or more noun concepts comprise one or more sub-types, wherein each subtype of a noun concept is identified as an example noun categorized under the noun concept;

dynamically build an inheritance hierarchy of one or more named vocabulary concepts from the one or more controlled natural language vocabularies;

parse a controlled natural language input textual statement, wherein said parsing comprises matching one or more roles in the one or more verb concepts against the controlled natural language input textual statement and using one or more names and the inheritance hierarchy to identify one or more temporal concepts and one or more complex event processing concepts, and wherein said parsing is carried out via a parser component, executing on a hardware processor, that comprises (i) a specified built-in vocabulary and (ii) specified instructions to distinguish defined terms from undefined terms in the controlled natural language input textual statement using the built-in vocabulary;

convert the controlled natural language input textual statement to a complex event processing language statement by generating a representation of a lexical structure of the controlled natural language input textual statement that contains a reference to each identified temporal and complex event processing concept, wherein said converting comprises incorporating one or more synonyms for each identified temporal concept and complex event processing concept; and output the complex event processing language statement to an automated complex event processing system for use in event processing.

21. The system of claim 20, wherein the one or more vocabularies comprise a built-in vocabulary with a parser module and one or more additional vocabularies that extend capabilities of the parser module by defining one or more additional terms for noun concepts and verb concepts, wherein the one or more additional vocabularies comprise at least one of a business domain-specific vocabulary, a predefined complex event processing vocabulary and a pre-defined temporal vocabulary.

22. The system of claim 20, wherein the at least one processor coupled to the memory is further operative to produce an abstract syntax tree from the input textual statement and input the abstract syntax tree to a transformation module for conversion to a complex event processing language statement, wherein inputting the abstract syntax tree to a transformation module for conversion to a complex event processing language statement comprises:

recognizing the reference to each identified temporal and complex event processing concept in the abstract syntax tree and converting each reference to a complex event processing concept in a complex event processing system; and recognizing one or more applications of one or more temporal and complex event processing concepts in the abstract syntax tree and converting each application to one or more complex event processing semantic relationships in the complex event processing system such that the complex event processing system can recognize one or more derived events from one or more basic events according to one or more complex event processing functions.

* * * * *